Oct. 8, 1935. V. F. BRYANT 2,016,955
COMBINATION BUMPER AND RACK
Filed Nov. 26, 1934
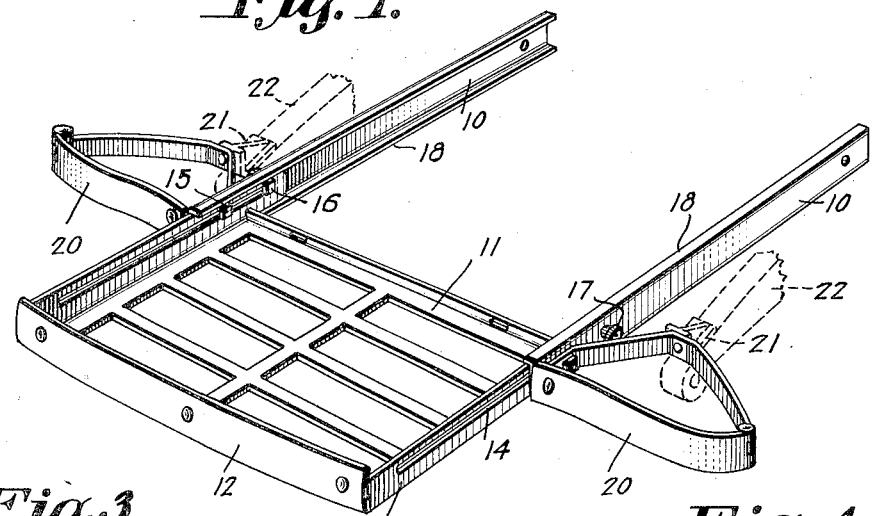
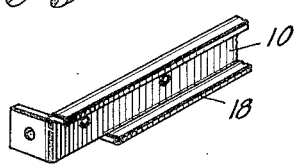
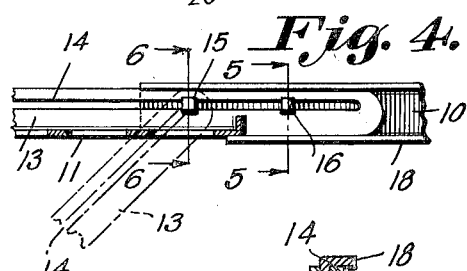
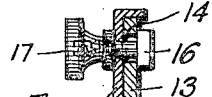
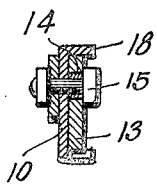
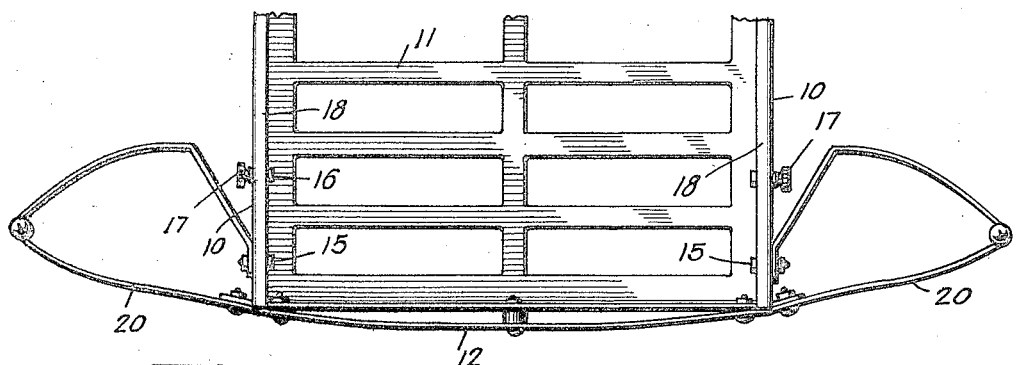
Virgil F. Bryant,
INVENTOR
BY Victor J. Evans & Co.
ATTORNEY Patented Oct. 8, 1935

2,016,955

UNITED STATES PATENT OFFICE 2,016,955

COMBINATION BUMPER AND RACK

Virgil F. Bryant, Memphis, Tenn.

Application November 26, 1934, Serial No. 754,883

1 Claim. (Cl. 293—55)

The invention relates to a combination rear bumper and rack for automobiles and more especially to an extensible trunk or baggage rack and bumper.

The primary object of the invention is the provision of a rack and bumper of this character, wherein the same has the appearance of the ordinary bumper and the trunk or baggage rack is instantly available at all times and will not interfere with or prevent the removal of the spare tire or wheel as carried at the rear of the automobile.

Another object of the invention is the provision of a rack and bumper of this character, wherein the same is fitted to the chassis of the automobile and has the appearance of a rear bumper, yet is extensible for accommodating luggage and in the construction avoids or eliminates the necessity of side mounts for spare tires or wheels.

A still further object of the invention is the provision of a rack and bumper of this character which is simple in construction, thoroughly reliable and efficient in its purpose, strong, durable, does not detract from the appearance of the automobile, readily and easily handled, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a perspective view of the combined bumper and rack constructed in accordance with the invention.

Figure 2 is a top plan view showing the parts in normal position.

Figure 3 is a fragmentary perspective view of one of the channeled rails of the device.

Figure 4 is a fragmentary longitudinal sectional view showing by full lines the extended position of the rack and by dotted lines a lowered position thereof.

Figure 5 is a sectional view on the line 5—5 of Figure 4 looking in the direction of the arrows.

Figure 6 is a sectional view on the line 6—6 of Figure 4 looking in the direction of the arrows.

Similar reference characters indicate corresponding parts throughout the several views in the drawing.

Referring to the drawing in detail, the combination device comprises a pair of channeled side rails 10, these being preferably made secure at their inner ends to the chassis of the vehicle or automobile. Slidably fitting the rails 10 is a luggage rack 11, it having at its front a bumper section 12, made secure thereto, while the sides 13 of the rack 11 are provided with slots 14, these receiving the fasteners 15 and 16, respectively, mounted in the rails 10, the fasteners 16 including separable knob-like nuts 17, so that the same can be readily separated from the rails 10 and the sides 13 of the rack 11, the nuts 17 being located at the outer sides of the rails 10 in convenient reach. These fasteners 15 and 16 allow for sliding of the rack 11 and the fastening thereof in extended or retreated position. The rails 10 at their bottom flanged edges 18 are cut away, at 19, to permit the lowering of the rack 11 from the full line position to the dotted line position shown in Figure 4 of the drawing and this is accomplished by the removal of the fasteners 16 with the nuts 17 to allow for the handling of the spare tire as carried at the rear of the automobile.

The rails 10 at their outer sides have bolted or otherwise fastened thereto the bumper sections 20, these being also secured to brackets 21 attached to the chassis 22 of the motor vehicle.

It will be seen that when the rack 11 is slid inwardly of the rails 10 the bumper section 12 will match the bumper sections 20 to have the appearance of the ordinary rear end bumper as carried by motor vehicles.

When the rack 11 is to be used the same is pulled outwardly from the channeled rails 10 and made secure in the extended position by the fasteners 16 so that such rack will support luggage or other articles to be transported.

What is claimed is:

The combination of a pair of channeled rails adapted for mounting with an automobile, a rack slidably fitting said channeled rails, a bumper section carried by the rack, outer bumper sections fixed to the rails and to a chassis of the automobile to be disposed at opposite sides of said rack, means for fastening the rack retreated or extended, the said channeled rails being cut away at their lower sides for a distance to permit the lowering of the rack, and means slidably connecting the rack with the channeled rails.

VIRGIL F. BRYANT.